United States Patent [19]
Kato et al.

[11] Patent Number: 5,706,129
[45] Date of Patent: Jan. 6, 1998

[54] BINOCULARS WITH EXTRACTION OF A PORTION OF LIGHT RAYS

[75] Inventors: Masato Kato, Otsu; Yasumasa Sugihara, Hashimoto; Naoki Ishihara, Sakai, all of Japan

[73] Assignee: Minolta Co., Ltd., Osaka, Japan

[21] Appl. No.: 647,660

[22] Filed: May 15, 1996

[30] Foreign Application Priority Data

May 17, 1995 [JP] Japan .................... 7-118518

[51] Int. Cl.$^6$ ............ G02B 23/00; G02B 27/10; G02B 7/06; G02B 7/09
[52] U.S. Cl. ............ 359/418; 359/425; 250/201.4
[58] Field of Search .............. 359/410, 414, 359/416, 417, 418, 425, 426; 250/204, 201.4, 201.2, 201.7

[56] References Cited

U.S. PATENT DOCUMENTS 4,293,187 10/1981 Ishibai et al. ............... 359/418
5,126,549 6/1992 Yamada .
5,572,361 11/1996 Kamiya et al. ............... 359/410

*Primary Examiner*—Jon W. Henry
*Attorney, Agent, or Firm*—Burns, Doane, Swecker & Mathis, LLP

[57] ABSTRACT

A pair of binoculars includes a first optical system; a second optical systems; a light rays separators that extracts from the first optical system a portion of light rays that pass through the first optical systems; a device for examining the extracted light rays; a device for adjusting parts of the first and second optical systems based on a results of the examination of the extracted light rays; and a light reducer located in the second optical system for separating light rays equivalent to the light rays extracted by the light rays separator from the light rays passing through the second optical system.

29 Claims, 7 Drawing Sheets

FIG. 2
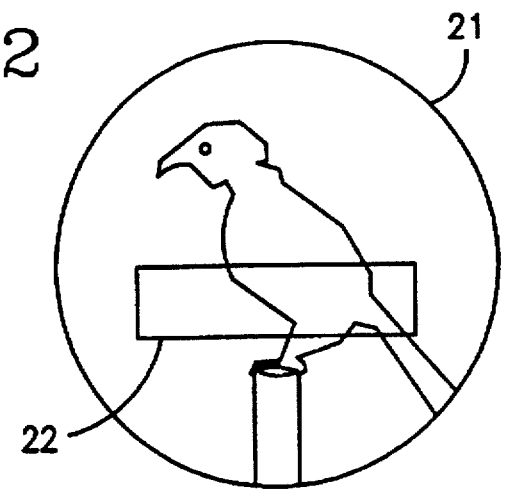
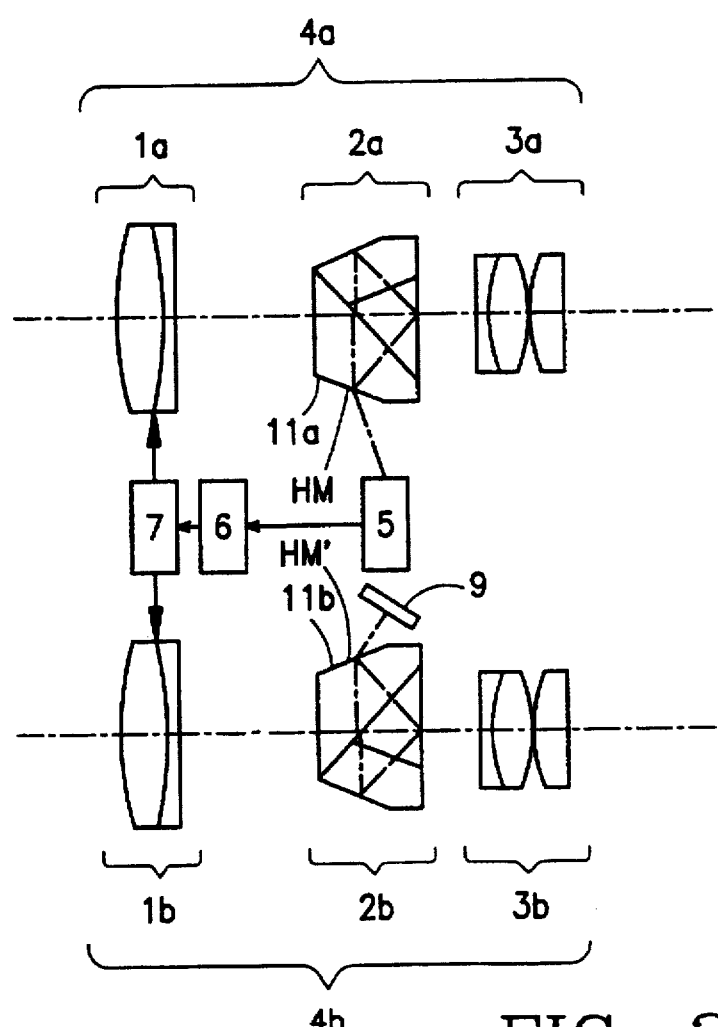
FIG. 3

BINOCULARS WITH EXTRACTION OF A PORTION OF LIGHT RAYS

BACKGROUND OF THE INVENTION

1. Field of the Invention

The present invention pertains to binoculars, and more particularly, to binoculars in which a portion of the light rays entering the object lens optical system is used for such things as distance measurement and light measurement.

2. Description of the Related Art

Japanese Laid Open Patent Sho 59-802 discloses binoculars in which TTL (through-the-lens) distance measurement is performed through the matching of two images using a portion of the light rays passing through the right and left object lens optical systems. In such binoculars, the positional relationship between the right and left lens mounts may be changed by means of a moving mechanism located between the lens mounts, the moving mechanism being used to adjust the distance between the lens mounts. The change in the positional relationship between the right and left lens mounts affects the distance measurement. Consequently, it becomes difficult to ensure accuracy, and at the same time adjustment for distance measurement becomes complex. In addition, the size of the construction of the entire binoculars increases because of the moving mechanism.

On the other hand, in the binoculars disclosed in Japanese Laid Open Patent Hei 4-20915, distance measurement is performed using a portion of the light rays passing through the object lens optical system of one lens mount whose erect prism system has a semi-transmitting reflective surface. The problems described in the above paragraph do not occur in such binoculars.

However, in the latter binoculars, there is a difference in the nature of the light (reflectance characteristics, for example) between the light that advances to the eyepiece optical system in the lens mount that is used for distance measurement and the light that advances to the eyepiece optical system of the other lens mount, due to the optical characteristics of the semi-transmitting surface.

For example, the amount of light that advances to the eyepiece optical system in the lens mount used for distance measurement is smaller than the amount of light that advances to the eyepiece optical system in the other lens mount, as a result of which there is a difference in brightness between the right and left lens mounts. If the transmissivity of the semi-transmitting surface is increased in order to achieve better accuracy in distance measurement, in particular, or in other words, if the amount of light used for distance measurement is increased, there would be a large difference in brightness between the right and left lens mounts. Such a difference in brightness between the lens mounts causes discomfort to a user looking into the binoculars with both eyes.

If the transmissivity of the semi-transmitting surface is the same throughout all wavelengths, there will be no difference in the color of light between the right and left lens mounts and only a difference in brightness will occur. However, in actuality, since the semi-transmitting surface has some particular spectral characteristics regarding transmittance and reflectivity (i.e., the characteristic that the light transmissivity and reflectance will vary depending on the wavelength), there will be a difference in the color of light between the right and left lens mounts as well. Such a difference in the color of light between the lens mounts also causes discomfort to the user who looks into the binoculars with both eyes.

OBJECTS AND SUMMARY

An object of the present invention is to resolve the problems described above.

Another object of the present invention is to provide binoculars which do not cause discomfort to the user who looks into them with both eyes.

Yet another object of the present invention is to provide binoculars in which light rays are extracted from the optical path of one lens mount and used for distance measurement or light measurement, wherein the color and amount of light is the same for either eye.

These and other objects are attained by binoculars comprising a first optical system comprising, from the object side, an object lens optical system, an erect prism system and an eyepiece optical system; a second optical system comprising, from the object side, an object lens optical system, an erect prism system and an eyepiece optical system; a light rays separating means that extracts from the first optical system a portion of the light rays that pass through the first optical system; an examining means that examines the light rays thus separated, a moving means that moves parts of the first and second optical systems based on the result of the examination; and a light reducing means that is located in the second optical system and that eliminates light rays equivalent to the light rays extracted by the light rays separating means from the light rays passing through the second optical system.

These and other objects are also attained by binoculars in which a portion of the light rays is separated from the first lens mount and distance measurement is performed based on the light rays thus separated, the binoculars further comprising a means to separate from the second lens mount light rays equivalent to the light rays separated from the first lens mount.

These and other objects are also attained by binoculars equipped with two lens mounts each comprising, from the object side, an object lens optical system, an erect prism system and an eyepiece optical system, wherein one of the reflecting surfaces of the erect prism system of one of the lens mounts is a semi-transmitting surface to extract a portion of the light rays, and the reflectance characteristics of the semi-transmitting surface are set such that they meet the following conditions.

$$|a^*(TB) - a^*(TA)| \leq 4$$

$$|b^*(TB) - b^*(TA)| \leq 4$$

where a* (TA) and b* (TA) are values of a* and b* of the CIELAB color system regarding light passing through the first optical system, and a* (TB) and b* (TB) are values of a* and b* on the CIELAB color system regarding the light passing through the second optical system.

BRIEF DESCRIPTION OF THE DRAWINGS

These and other objects and features of the present invention will become apparent from the following description of preferred embodiments thereof taken in conjunction with the accompanying drawings, in which:

FIG. 2 shows the distance measurement range of the binoculars of the first embodiment;

FIG. 3 shows the construction of binoculars according to a second embodiment;

3

Figure 5:
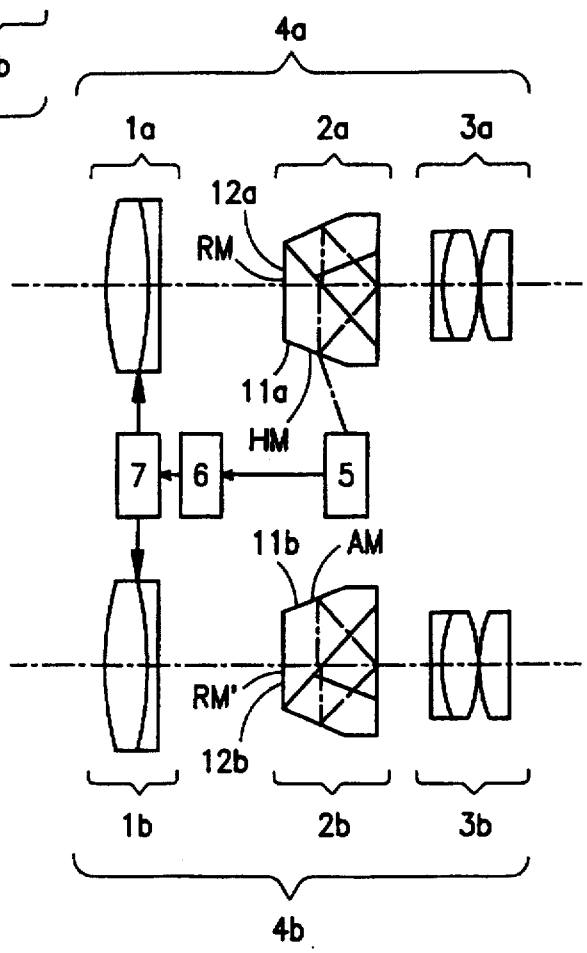
Figure 6:
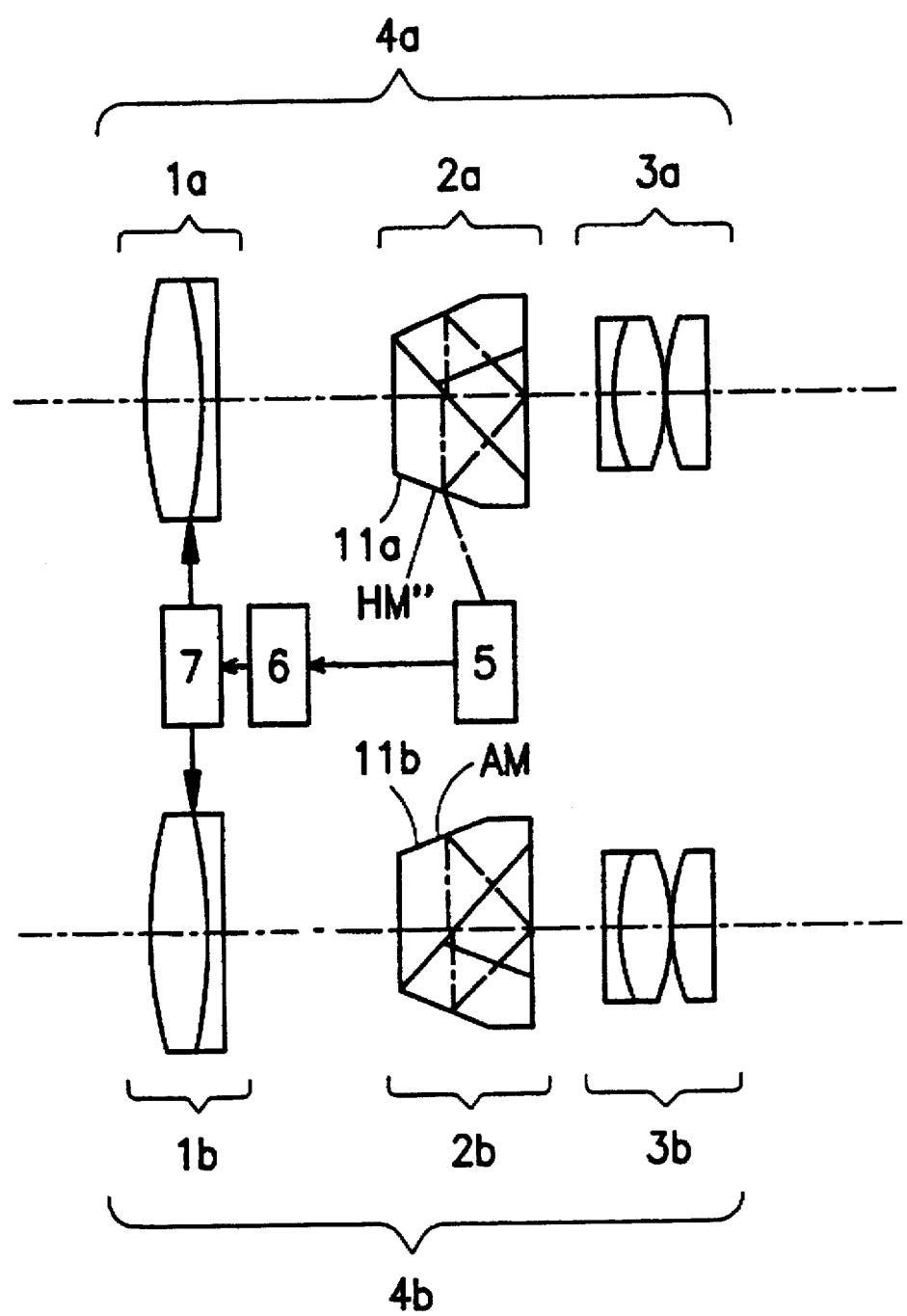
Figure 7:
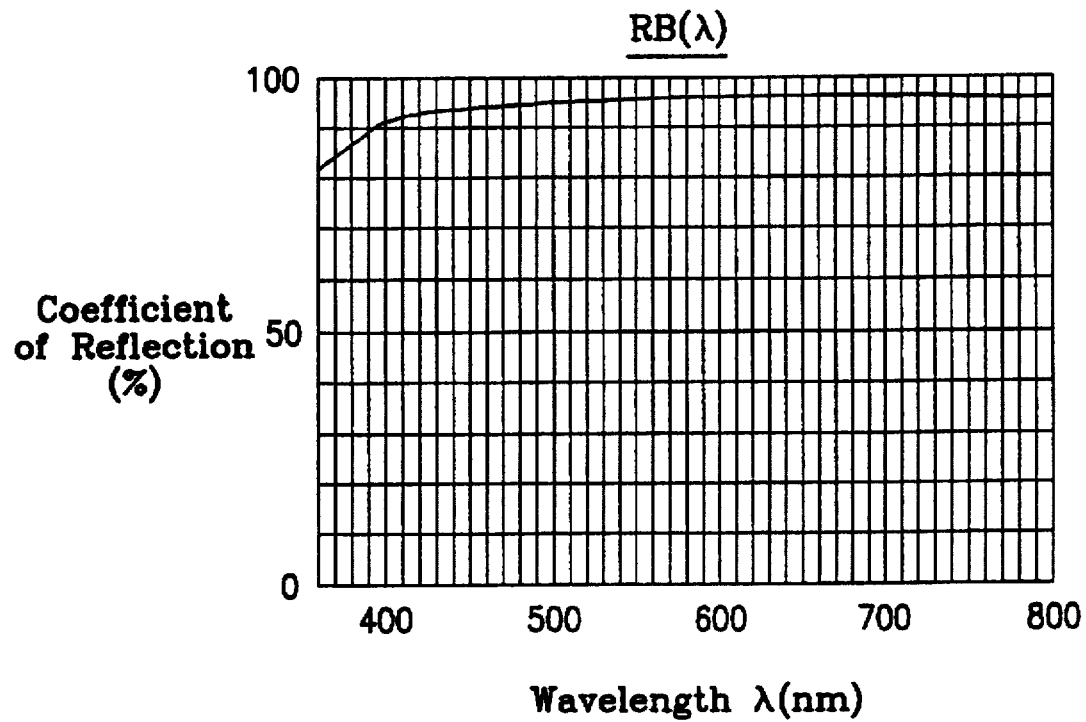
Figure 8:
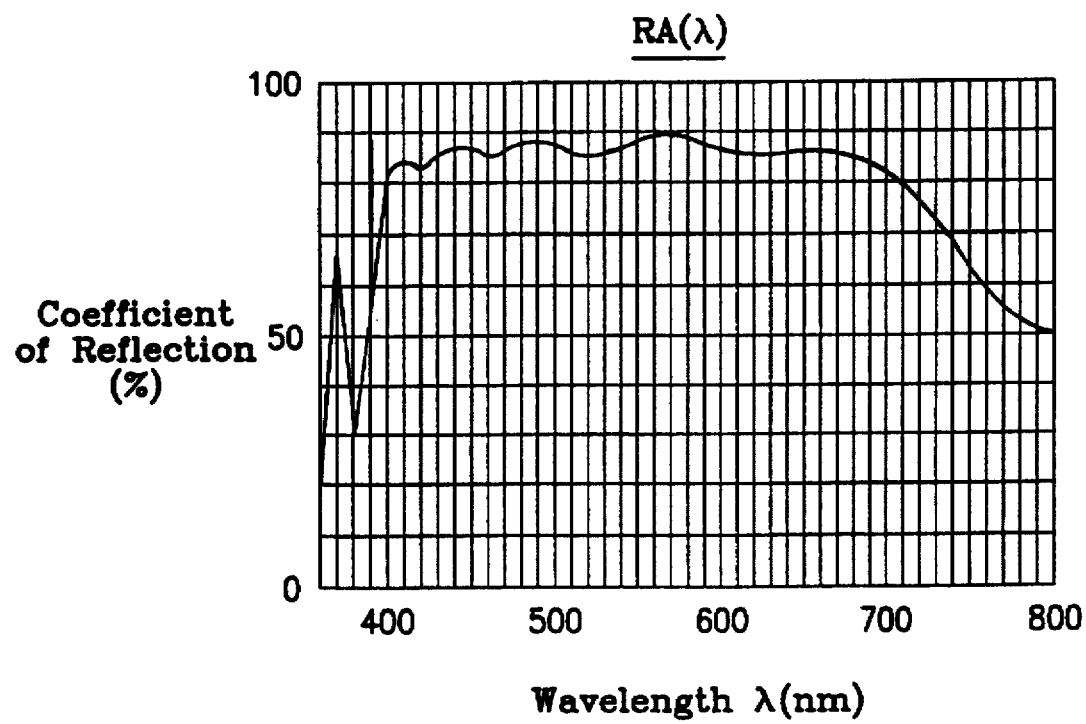
Figure 9:
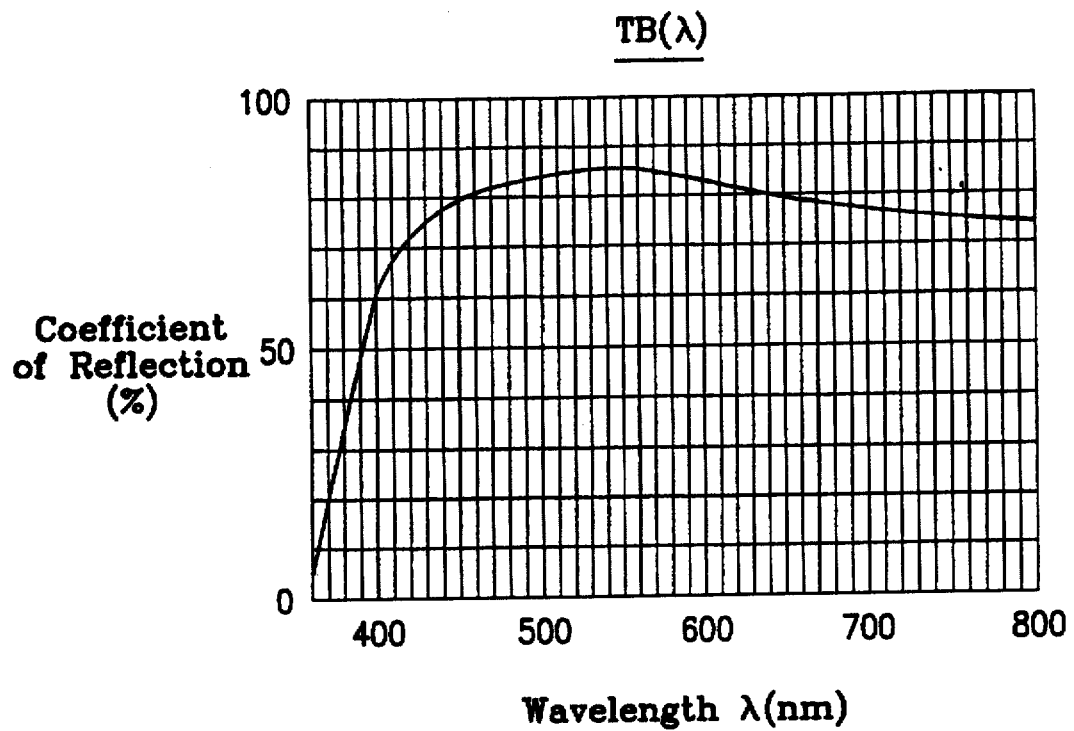
Figure 10:
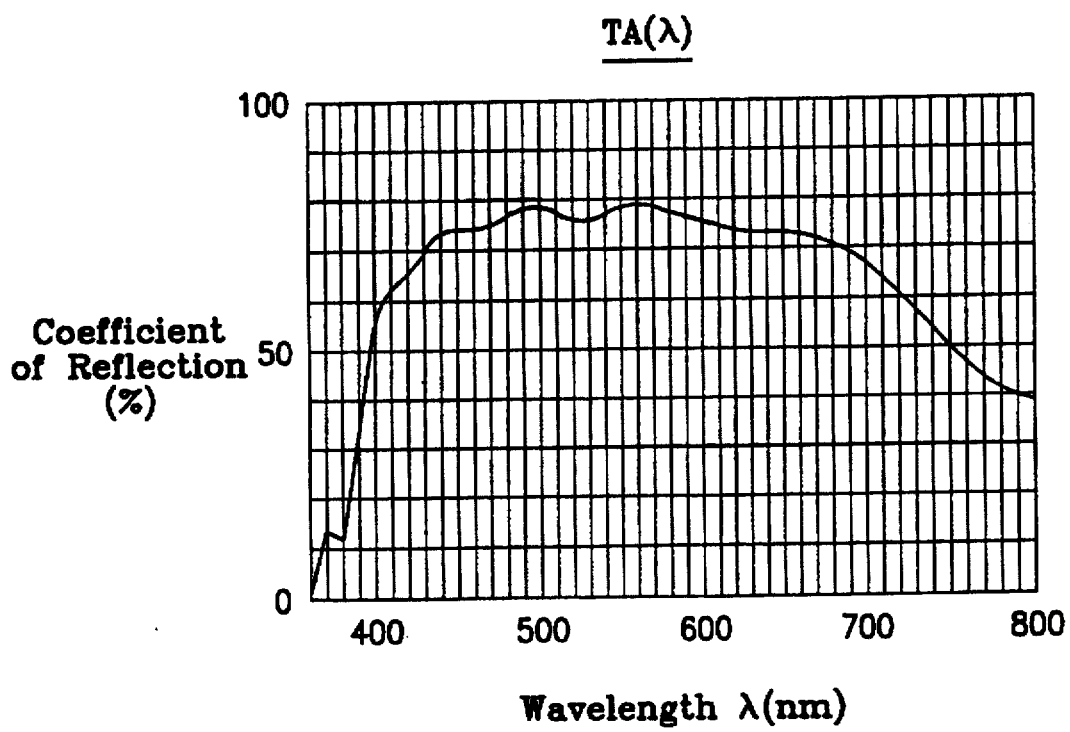
Figure 11:
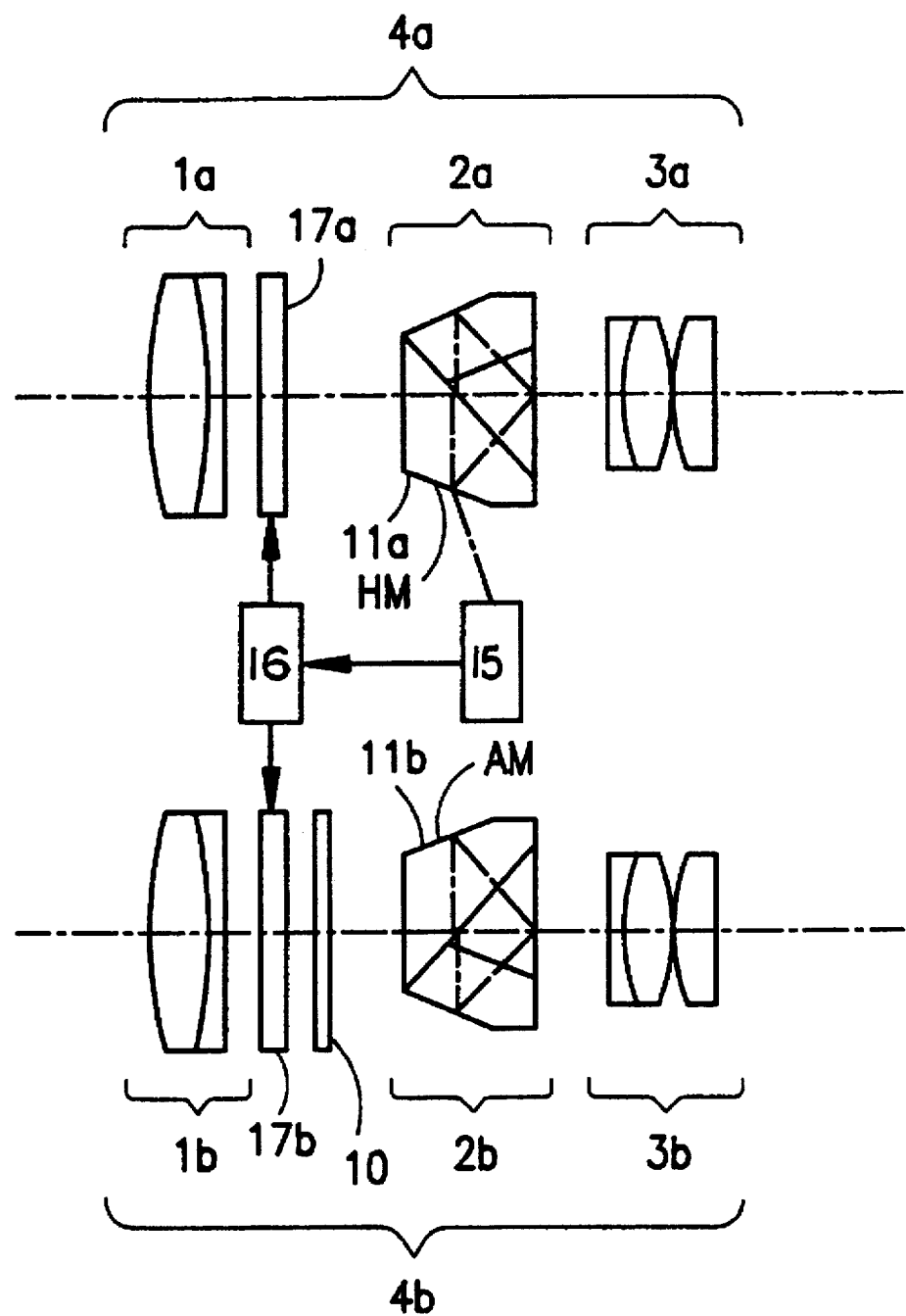

FIG. 5 shows the construction of binoculars according to a fourth embodiment;

FIG. 6 shows the construction of binoculars according to a fifth embodiment;

FIG. 7 is a graph showing the reflectance characteristics of the silver reflecting film formed on the second reflecting surface of the erect prism system in the nondistance measuring lens mount of the fifth embodiment;

FIG. 8 is a graph showing the reflectance characteristics of the semi-transmitting film formed on the second reflecting surface of the erect prism system of the distance measuring lens mount of the fifth embodiment;

FIG. 9 is a graph showing the transmissivity characteristics of the entire nondistance measuring lens mount of the fifth embodiment;

FIG. 10 is a graph showing the transmissivity characteristics of the entire distance measuring lens mount of the fifth embodiment; and FIG. 11 shows the construction of binoculars according to a sixth embodiment.

In the following description, like parts are designated by like reference numbers throughout the several drawings.

DETAILED DESCRIPTION OF THE PREFERRED EMBODIMENTS

Binoculars in which the present invention is applied are explained below with reference to the drawings. Identical members and equivalent members are indicated by the same numbers throughout the embodiments.

First embodiment

Figure 1:
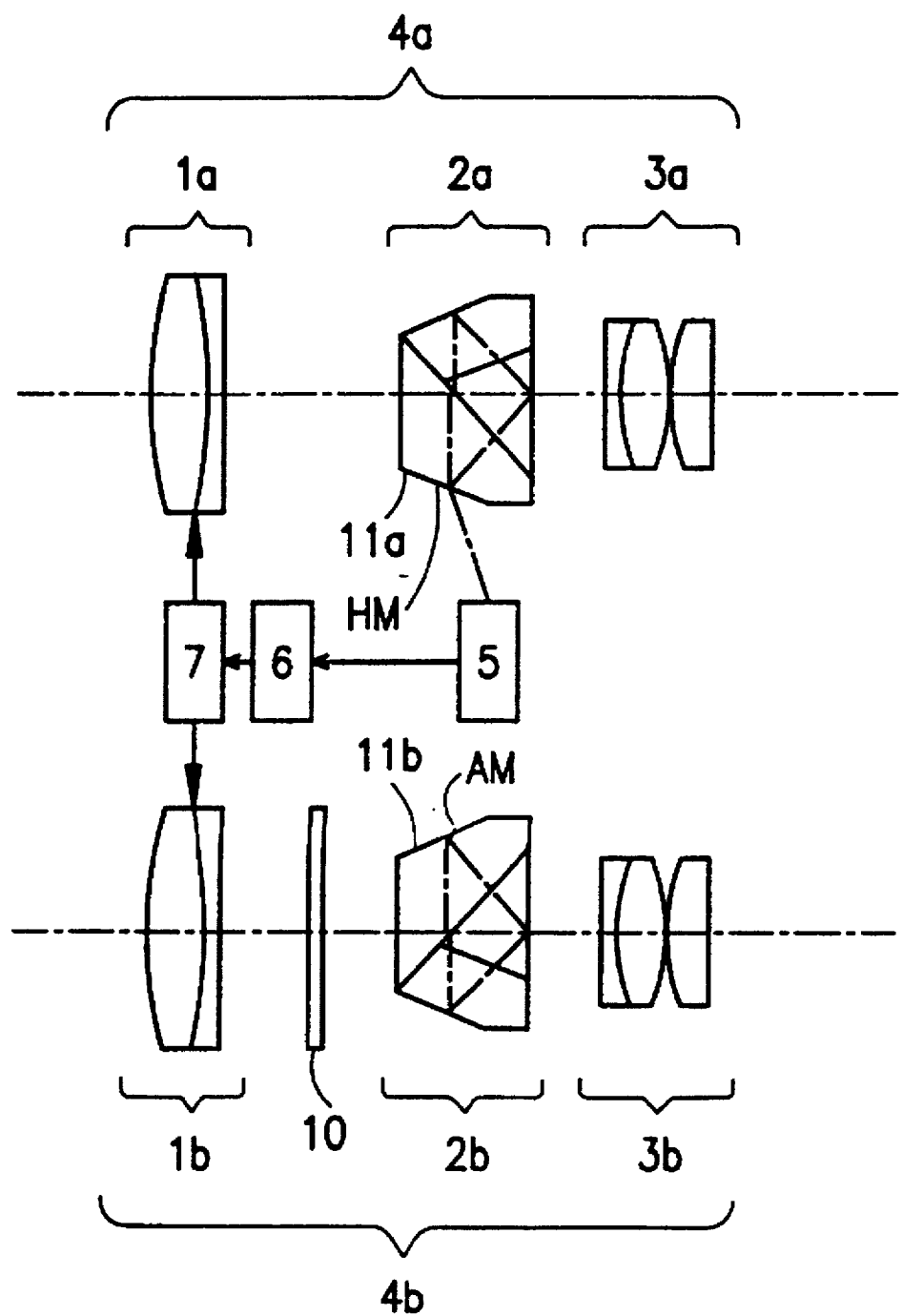
FIG. 1 shows the construction of binoculars according to a first embodiment.

FIG. 1 shows the construction of the binoculars of a first embodiment of the present invention that is capable of TTL distance measurement using one lens mount 4a. Embodiment 1 comprises autofocus binoculars. These autofocus binoculars are equipped with two lens mounts 4a and 4b comprising, from the object side, object lens optical systems 1a and 1b, erect prism systems 2a and 2b, and eyepiece optical systems 3a and 3b, respectively. The autofocus binoculars are further equipped with distance measurement system 5, control system 6 that processes signals from distance measurement system 5 and generates focusing signals, and drive system 7 that performs focusing by moving object lens optical systems 1a and 1b of lens mounts 4a and 4b, respectively, based on signals from control system 6. The light rays in distance measurement range 22, which is a part of entire field of view 21, are used for TTL distance measurement, as shown in FIG. 2.

Erect prism system 2a located in the optical path of lens mount 4a is coated on the entire second reflecting surface 11a with semi-transmitting film HM as a light rays separating means to extract a portion of the light rays. This semi-transmitting film HM separates and extracts a portion of the light rays that enter erect prism system 2a from object lens optical system 1a and leads the light rays to distance measurement system 5. Distance measurement system 5 performs distance measurement using the light rays thus extracted by semi-transmitting film HM.

On the other hand, erect prism system 2b located in the optical path of lens mount 4b is coated on the entire second reflecting surface 11b with silver reflecting film AM. ND filter 10 is placed behind object lens optical system 1b located in the optical path of lens mount 4b. ND filter 10 is a member separate from object lens optical system 1b, erect prism system 2b and eyepiece optical system 3b. ND filter

4

10 is a light amount correcting means that equalizes the transmissivities as to the light that pass through lens mounts 4a and 4b. In other words, the transmissivity of the entire lens mount 4a and that of the entire lens mount 4b become identical by means of ND filter 10. Namely, while only the light rays in lens mount 4a are used for the purpose of distance measurement, the difference in the amount of light between the light advancing to eyepiece optical system 3a in lens mount 4a and the light advancing to eyepiece optical system 3b in lens mount 4b is eliminated by this ND filter 10. Therefore, when the user looks into the binoculars with both eyes, he does not feel discomfort caused by the difference in brightness between lens mounts 4a and 4b. Using the first embodiment, autofocusing may be performed by extracting a portion of the light rays from the optical path of one lens mount 4a without inflicting on the user discomfort caused by the difference in the amount of light between the light advancing to eyepiece optical system 3a of lens mount 4a and the light advancing to eyepiece optical system 3b of lens mount 4b.

In addition, in the first embodiment, if the colors of the light passing through the lens mounts are made the same between lens mounts 4a and 4b by means of using a color correcting filter instead of ND filter 10, the difference in color between the light advancing to eyepiece optical system 3a and the light advancing to eyepiece optical system 3b is eliminated. This will prevent discomfort caused by the difference in color when the user looks into the binoculars with both eyes. If a filter that corrects both the color and amount of light is used instead of ND filter 10, the differences in terms of the color of light and the amount of light between the light advancing to eyepiece optical system 3a and the light advancing to eyepiece optical system 3b can both be eliminated. In other words, a filter such as this can effectively prevent the user from feeling discomfort arising out of either the amount or color of light.

In both binoculars and monocular viewing devices, if the distance measurement range frame were to be displayed in the field of view as it is in a camera, it would hinder observation. Therefore, there are cases in which the distance measurement range frame is not displayed. However, if the distance measurement range frame is not displayed, the user cannot adjust the distance measurement range frame to the object of observation. Further, the object of observation is often off-center in the field of view due to shaking of the hands holding the binoculars, or due to the user's inability to follow the object when he is trying to follow a moving object.

In view of the situation described above, the first embodiment has a construction such that distance measurement range frame 22 is positioned slightly lower than the center of field of view 21, as shown in FIG. 2. Using this construction, distance measurement range frame 22 does not hinder observation significantly. In addition, since the object of observation often has a shape that becomes larger toward the bottom, such as a person, a bird perched on a tree or a building, distance measurement range frame 22 deviates from the object of observation less easily when it is located below the center of field of view 21.

Furthermore, when the position of distance measurement range frame 22 is located somewhat off from the intended position during manufacturing, if it is located above the center of field of view 21, it is problematic for the same reason described above, but if the intended position is slightly lower than the center of field of view 21 to begin with, even if distance measurement range frame 22 is above or below the intended position, it does not create major problems. In other words, fine vertical adjustment in positioning distance measurement range frame 22 is unnecessary. This construction is effective not only in TTL distance measurement-type models such as this embodiment in which distance measurement is performed using a part of the light passing through object lens optical system 1a, but also where distance measurement is performed using a separate independent optical system.

Second Embodiment

FIG. 3 shows the construction of a second embodiment that can perform TTL distance measurement using one lens mount 4a. The second embodiment comprises autofocus binoculars. These autofocus binoculars are equipped with lens mounts 4a and 4b comprising, from the object side, object lens optical systems 1a and 1b, erect prism systems 2a and 2b, and eyepiece optical systems 3a and 3b, respectively. It is further equipped with distance measurement system 5, control system 6 that processes signals from distance measurement system 5 and generates focusing signals, and drive system 7 that performs focusing by moving object lens optical systems 1a and 1b of lens mounts 4a and 4b based on signals from control system 6. Light rays in distance measurement range frame 22 (FIG. 2), which is a part of entire field of view 21, are used for TTL distance measurement in the same manner as in the first embodiment.

Erect prism system 2a located in the optical path of lens mount 4a is coated in this embodiment with semi-transmitting film HM on the entire second reflecting surface 11a as a light rays separating means to extract a portion of the light rays. This semi-transmitting film HM separates and extracts a portion of the light rays that enter erect prism system 2a from object lens optical system 1a and leads the light rays to distance measurement system 5. Distance measurement system 5 performs distance measurement using the light rays thus extracted by semi-transmitting film HM.

On the other hand, erect prism system 2b located in the optical path of lens mount 4b is also coated with a semi-transmitting film HM' having the same optical characteristics as semi-transmitting film HM formed on second reflecting surface 11a of erect prism system 2a. The colors of the light rays that pass through lens mounts 4a and 4b and their transmissivities are equalized by this semi-transmitting film HM'. Further, a light shielding member 9 shields the light that passes through semi-transmitting film HM' located on second reflecting surface 11b, and is placed adjacent to erect prism 2b. In lens mount 4b, the light passing through semi-transmitting film HM' on second reflecting surface 11b becomes unnecessary extra light. However, because this light is shielded by light shielding member 9, it does not advance past erect prism system 2b or reach the eyes of the user through eyepiece optical system 3b.

As described above, while only the light rays in lens mount 4a are used for the purpose of distance measurement, because semi-transmitting film HM' and semi-transmitting film HM have the same optical characteristics, the differences in terms of the color of light and amount of light between the light advancing to eyepiece optical system 3a and the light advancing to eyepiece optical system 3b are effectively eliminated by this semi-transmitting film HM'. Consequently, discomfort caused by the differences in color and brightness between the light in lens mount 4a and the light in lens mount 4b may be prevented when the user looks into the binoculars with both eyes.

Using the second embodiment, autofocusing may be performed by extracting a portion of the light rays from the optical path of one lens mount 4a without inflicting on the user discomfort caused by the differences in the color and amount of light between the light advancing to eyepiece optical system 3a of lens mount 4a and the light advancing to eyepiece optical system 3b of lens mount 4b.

While semi-transmitting film HM' is used on the surface of erect prism system 2b as a correcting means in this second embodiment, the present invention is not limited to this. Instead, a film coating such as semi-transmitting film HM' may be placed on the surface of a lens comprising object lens optical system 1b or eyepiece optical system 3b or on a surface of protective glass (not shown in the drawing) as a correcting means. Protective glass is glass placed at the furthest front part of the lens mount (lens mounts of binoculars for outdoor use in particular) for the purpose of protection from dust, water, etc., the protective glass having nothing to do with the lens systems. Additionally, while the lenses automatically move back and forth during autofocusing in binoculars, movement of the lenses may be prevented because the lenses are held by fingers. This can also be prevented by means of protective glass.

Third Embodiment

Figure 4:
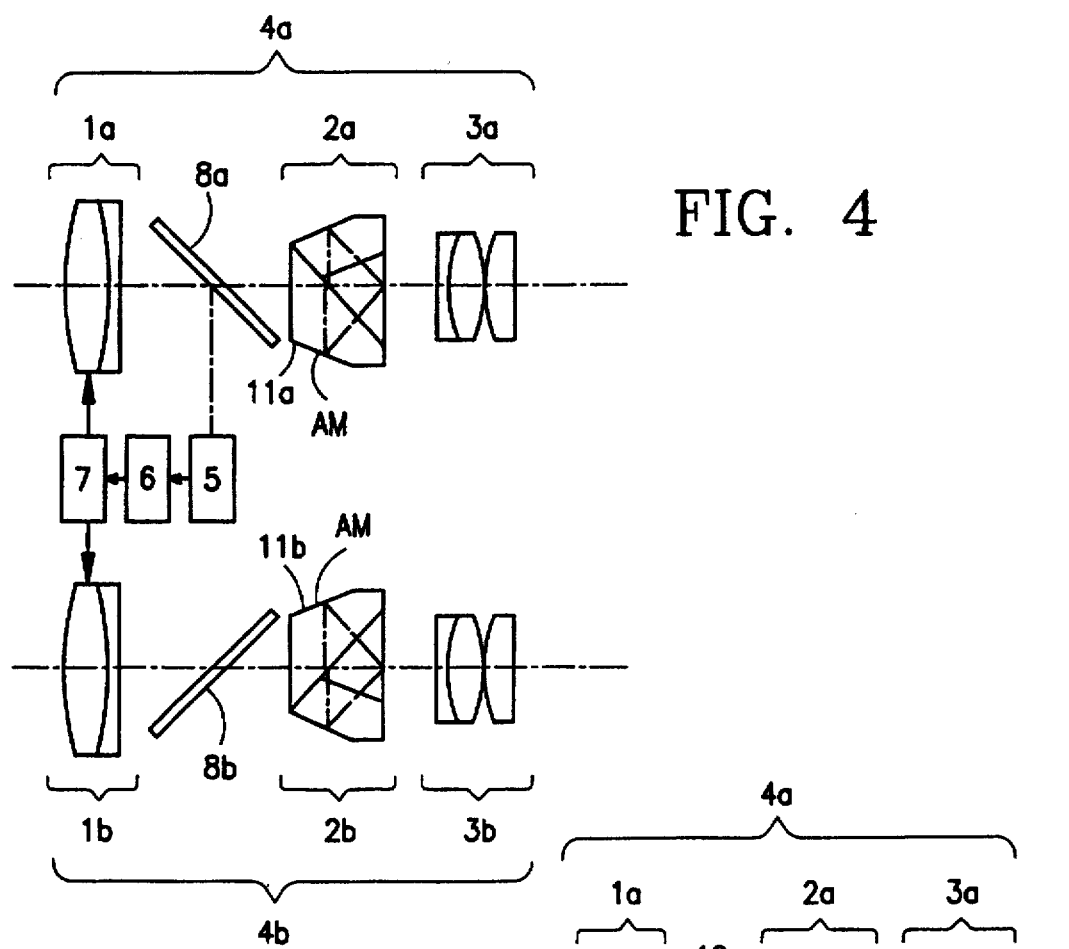
FIG. 4 shows the construction of binoculars according to a third embodiment.

FIG. 4 shows the construction of the third embodiment that can perform TTL distance measurement using one lens mount 4a. The third embodiment comprises autofocus binoculars. These autofocus binoculars are equipped with lens mounts 4a and 4b comprising, from the object side, object lens optical systems 1a and 1b, erect prism systems 2a and 2b, and eyepiece optical systems 3a and 3b, respectively. These binoculars are further equipped with distance measurement system 5, control system 6 that processes signals from distance measurement system 5 and generates focusing signals, and drive system 7 that performs focusing by moving object lens optical systems 1a and 1b of lens mounts 4a and 4b based on signals from control system 6. Light rays in distance measurement range frame 22 (FIG. 2), which is a part of entire field of view 21, are used for TTL distance measurement in the same manner as in the first embodiment.

Erect prism systems 2a and 2b located in the optical paths of lens mounts 4a and 4b, respectively, are coated with regular silver reflecting film on second reflecting surfaces 11a and 11b. Half mirror 8a to extract a portion of the light rays is placed behind object lens optical system 1a located in the optical path of lens mount 4a. This half mirror 8a is a member separate from object lens optical system 1a, erect prism system 2a and eyepiece optical system 3a. Half mirror 8a separates and extracts a portion of the light rays that pass through object lens optical system 1a and leads the light rays to distance measurement system 5. Distance measurement system 5 performs distance measurement using the light rays thus extracted by half mirror 8a.

On the other hand, as a correcting means to equalize the colors of light passing through lens mounts 4a and 4b and their transmissivities, half mirror 8b having the same optical characteristics as half mirror 8a is also placed behind object lens optical system 1b located in the optical path of lens mount 4b.

While only the light rays in lens mount 4a are used for the purpose of distance measurement, since half mirror 8b has the same optical characteristics as half mirror 8a, there is little difference in terms of the color of light and amount of light between the light advancing to eyepiece optical system 3a and the light advancing to eyepiece optical system 3b. Consequently, discomfort caused by differences in color and brightness between the light in lens mount 4a and the light in lens mount 4b may be prevented when the user looks into the binoculars with both eyes.

Using the third embodiment, autofocusing may be performed by extracting a portion of the light rays from the optical path of one lens mount 4a without inflicting on the user discomfort caused by differences in the color and amount of light between the light advancing to eyepiece optical system 3a of lens mount 4a and the light advancing to eyepiece optical system 3b of lens mount 4b.

Fourth Embodiment

FIG. 5 shows the construction of the fourth embodiment that can perform TTL distance measurement using one lens mount 4a. The fourth embodiment comprises autofocus binoculars. These autofocus binoculars are equipped with lens mounts 4a and 4b comprising, from the object side, object lens optical systems 1a and 1b, erect prism systems 2a and 2b, and eyepiece optical systems 3a and 3b, respectively. They are further equipped with distance measurement system 5, control system 6 that processes signals from distance measurement system 5 and generates focusing signals, and drive system 7 that performs focusing by moving object lens optical systems 1a and 1b of lens mounts 4a and 4b based on signals from control system 6. Light rays in distance measurement range frame 22 (FIG. 2), which is a part of entire field of view 21, are used for TTL distance measurement in the same manner as in the first embodiment.

The entire second reflecting surface 11a of erect prism system 2a located in the optical path of lens mount 4a is coated with semi-transmitting film HM, as a light rays separating means to extract a portion of the light rays. This semi-transmitting film HM separates and extracts a portion of the light rays that enter erect prism system 2a from object lens optical system 1a and leads the light rays to distance measurement system 5. Distance measurement system 5 performs distance measurement using the light rays thus extracted by semi-transmitting film HM. The entire light entering surface 12a of erect prism system 2a is also coated with ordinary nonreflective film RM.

On the other hand, the entire second reflecting surface 11b of erect prism system 2b located in the optical path of lens mount 4b is coated with silver reflecting film AM. In addition, the entire light entering surface 12b of the erect prism system 2b is coated with correcting film RM' to correct the transmissivity (i.e., correct the amount of light) and color, as a correcting means to equalize the colors and transmissivities of the light passing through lens mounts 4a and 4b.

While only light rays in lens mount 4a are used for the purpose of distance measurement, the differences in terms of the color and amount of light between the light advancing to eyepiece optical system 3a and the light advancing to eyepiece optical system 3b are eliminated by this correcting film RM'. Consequently, discomfort caused by the differences in the color and brightness of the light in lens mount 4a and the light in lens mount 4b may be prevented when the user looks into the binoculars with both eyes.

Using the fourth embodiment, autofocusing may be performed by extracting a portion of the light rays from the optical path of one lens mount 4a without inflicting on the user discomfort caused by the differences in the color and amount of light between the light advancing to eyepiece optical system 3a of lens mount 4a and the light advancing to eyepiece optical system 3b of lens mount 4b.

In the fourth embodiment, correcting film RM' is placed on a surface of erect prism system 2b as a correcting means.

However, the present invention is not limited to this, and film coating like correcting film RM' may be placed on the surface of a lens comprising object lens optical system 1b or eyepiece optical system 3b or on a surface of protective glass (not shown in the drawing) as a correcting means.

Fifth Embodiment

FIG. 6 shows the construction of the fifth embodiment that can perform TTL distance measurement using one lens mount 4a. The fifth embodiment comprises autofocus binoculars. These autofocus binoculars are equipped with lens mounts 4a and 4b comprising, from the object side, object lens optical systems 1a and 1b, erect prism systems 2a and 2b, and eyepiece optical systems 3a and 3b, respectively. They are further equipped with distance measurement system 5, control system 6 that processes signals from distance measurement system 5 and generates focusing signals, and drive system 7 that performs focusing by moving object lens optical systems 1a and 1b of lens mounts 4a and 4b based on signals from control system 6. Light rays in distance measurement range frame 22 (FIG. 2), which is a part of entire field of view 21, are used for TTL distance measurement in the same manner as in the first embodiment.

The entire second reflecting surface 11a of erect prism system 2a located in the optical path of lens mount 4a is coated with semi-transmitting film HM", the film comprising a semi-transmitting surface to extract a portion of the light rays. This semi-transmitting film HM" separates and extracts a portion of the light rays that enter erect prism system 2a from object lens optical system 1a and leads the light rays to distance measurement system 5. Distance measurement system 5 performs distance measurement using the light rays thus extracted by semi-transmitting film HM".

On the other hand, the entire second reflecting surface 11b of erect prism system 2b located in the optical path of lens mount 4b is coated with silver reflecting film AM. Light entering surfaces and light exiting surfaces of the lenses and prisms comprising object lens optical systems 1a and 1b, erect prism systems 2a and 2b, and eyepiece optical systems 3a and 3b are coated with a single-layer nonreflective film made of MgF2.

FIG. 7 shows reflectance characteristics RB ($\lambda$) of silver reflecting film AM placed on second reflecting surface 11b of erect prism system 2b. FIG. 8 shows reflectance characteristics RA ($\lambda$) of semi-transmitting film HM" placed on second reflecting surface 11a of erect prism system 2a.

FIG. 9 shows transmissivity characteristics TB ($\lambda$) in the optical path from object lens optical system 1b to the eye via erect prism system 2b, and eyepiece optical system 3b wherein the surface 11b of the erect prism system 2b has a silver reflecting film AM placed thereon. FIG. 10 shows transmissivity characteristics TA ($\lambda$) in the optical path from object lens optical system 1a to the eye via erect prism system 2a and eyepiece optical system 3a wherein the surface 11b of the erect prism system 2b has a semi-transmitting film HM" placed thereon.

The color of the reflected light is expressed as a* and b, in the following equations (A) and (B) in terms of the CIELAB color system.

$$a^* = 500\{(X/Xn)^{1/3} - (Y/Yn)^{1/3}\} \quad (A)$$

$$b^* = 200\{(Y/Yn)^{1/3} - (Z/Zn)^{1/3}\} \quad (B)$$

Provided, however, that in equations (A) and (B), X, Xn, Y, Yn, Z and Zn are expressed by the following equations (C) through (H). Integration in equations (C) through (H) is performed with regard to wavelength λ in the visible range.

$$X = \int Q(\lambda) R(\lambda) x'(\lambda) d\lambda \quad (C)$$

$$Xn = \int Q(\lambda) x'(\lambda) d\lambda \quad (D)$$

$$Y = \int Q(\lambda) R(\lambda) y'(\lambda) d\lambda \quad (E)$$

$$Yn = \int Q(\lambda) y'(\lambda) d\lambda \quad (F)$$

$$Z = \int Q(\lambda) R(\lambda) z'(\lambda) d\lambda \quad (G)$$

$$Zn = \int Q(\lambda) z'(\lambda) d\lambda \quad (H)$$

Where, $Q(\lambda)$: Relative spectral distribution of CIE standard light D.

$R(\lambda)$: Reflectance characteristics.

$X'(\lambda), Y'(\lambda), Z'(\lambda)$: CIE spectrum tristimulus values.

If the color of the light reflected by semi-transmitting film HM" and the color of the light reflected by silver reflecting film AM are expressed in terms of the CIELAB color system, the following will result.

$a^*(RA) = -0.4$
$b^*(RA) = 1.1$
$a^*(RB) = -0.3$
$b^*(RB) = 1.1$

In the equations shown above, $a^*(RA)$ and $b^*(RA)$ are the values of $a^*$ and $b^*$, respectively, in the CIELAB color system regarding the light reflected by semi-transmitting film HM". $a^*(RB)$ and $b^*(RB)$ are the values of $a^*$ and $b^*$, respectively, in the CIELAB color system regarding the light reflected by silver reflecting film AM.

If reflectance characteristics $R(\lambda)$ in equations (A) and (B) expressing the color of the reflected light is replaced by transmissivity characteristics $TA(\lambda)$ and $TB(\lambda)$ of the light passing through the entire lens mount 4a and 4b, and the color of the light passing through the entire lens mount 4a and the color of the light passing through the entire lens mount 4b are expressed in terms of the CIELAB color system, the following results are obtained.

$a^*(TA) = -3.3$
$b^*(TA) = 3.1$
$a^*(TB) = -3.3$
$b^*(TB) = 3.3$

In the equations shown above, $a^*(TA)$ and $b^*(TA)$ are the values of $a^*$ and $b^*$, respectively, in the CIELAB color system regarding the light passing through the entire lens mount 4a. $a^*(TB)$ and $b^*(TB)$ are the values of $a^*$ and $b^*$, respectively, in the CIELAB color system regarding the light passing through the entire lens mount 4b.

The fifth embodiment is constructed such that the light passing through the entire lens mount 4a meets the following conditions (1) and (2).

$$|a^*(TB) - a^*(TA)| \leq 4 \quad (1)$$

$$|b^*(TB) - b^*(TA)| \leq 4 \quad (2)$$

Provided, however, that $a^*(TA)$ and $b^*(TA)$ are the values of $a^*$ and $b^*$, respectively, in the CIELAB color system regarding the light passing through the entire lens mount having the semi-transmitting surface. $a^*(TB)$ and $b^*(TB)$ are the values of $a^*$ and $b^*$, respectively, in the CIELAB color system regarding the light passing through the other entire lens mount.

In other words, reflectance characteristics $R(\lambda)$ of semi-transmitting film HM" (FIG. 8) are made close to reflectance characteristics $R(\lambda)$ of sliver reflecting film AM (FIG. 9) such that the absolute value of the differences between the values of a* and between the values of b* regarding the light passing through lens mounts 4a and 4b may be four or less. Consequently, the color of the light reflected by semi-transmitting film HM" (a*(RA), b*(RA) becomes almost identical to the color of the light reflected by silver reflecting film AM (a*(RB), b*(RB)).

To cause the reflectance characteristics of semi-transmitting film HM" to be closer to those of silver reflecting film AM, a method in which a material having unique reflectance characteristics is selected and is placed on second reflecting surface 11a through vapor deposition, etc., and a method in which the thickness of semi-transmitting film HM" formed on second reflecting surface 11a is adjusted and the changes in the color of the reflected light caused by interference are used are available, for example.

In order to learn the degree of difference in the color of light that does not cause discomfort to the user when he looks into lens mounts 4a and 4b, a sensitivity test of the human eye was conducted using binoculars having identical optical systems in both lens mounts in which a color filter is inserted in one of the lens mounts. As a result, it was confirmed that if the differences between the values of a* and between the values of b* regarding the light passing through the lens mounts are both four or less, no discomfort was experienced by the user.

While only light rays of lens mount 4a are used for the purpose of distance measurement, the construction is such that the color of the light reflected by semi-transmitting film HM" to extract a portion of the light rays, the film being located on one of the reflecting surfaces of erect prism system 2a, may be the same as the color of the light reflected by silver reflecting film AM, a reflecting surface of erect prism system 2b of the other lens mount 4b equivalent to semi-transmitting film HM". Therefore, due to the reflectance characteristics of semi-transmitting film HM" as described above, the light passing through lens mount 4a meets conditions (1) and (2) shown above. As a result, the difference in the color of the light advancing to eyepiece optical system 3a and the light advancing to eyepiece optical system 3b is eliminated. Consequently, discomfort caused by the difference in the color of the light in lens mount 4a and the light in lens mount 4b may be prevented when the user looks into the binoculars with both eyes.

Using the fifth embodiment, autofocusing may be performed by extracting a portion of the light rays from the optical path of one lens mount 4a without inflicting on the user discomfort caused by the difference in the color of light between the light advancing to eyepiece optical system 3a of lens mount 4a and the light advancing to eyepiece optical system 3b of lens mount 4b.

In addition, since the fifth embodiment has a simple construction in which correction regarding the amount of light does not take place in lens mount 4b, which is a non-TTL distance measurement lens mount, and semi-transmitting film HM" whose spectral reflectance characteristics are adjusted is used, it is most appropriate where it is desired to reduce the cost to the extent possible, or where it is desired to make lens mount 4b, the non-TTL distance measurement lens mount, as bright as possible.

It is preferred that the difference in the brightness of the light passing through lens mount 4a and the light passing through lens mount 4b (namely, the difference in the amount of light) be minimized through the selection of the material used and by adjustment of the thickness of the semi-transmitting film, such that the average reflectance of semi-transmitting film HM" may become close to that of reflecting film AM. The difference in the amount of light and the difference in the color of the light may also be reduced by integrating into the fifth embodiment ND filter 10 in the first embodiment, half mirror 8b in the third embodiment, or correcting film RM' in the fourth embodiment.

The constructions of the autofocus binoculars shown in the first through fifth embodiments are also effective in the event that light measurement is performed using the separated light rays, or where the light from a display element and light emitting element is synthesized by means of a semi-transmitting means such as a semi-transmitting film. Light measurement control includes, for example, control in which the shutters are automatically closed when intense light enters the lens mounts, such as where the user looks directly at the sun, and control of the apertures based on the light measurement result such that the binoculars can accommodate scenes of various brightness levels. Brightness measurement for the control of CCD (charge coupled device) integration time in distance measurement is also a form of light measurement applicable in the present invention.

Sixth Embodiment

The sixth embodiment is a specific example of binoculars that perform light measurement using separated light rays. FIG. 11 shows the construction of binoculars that can perform TTL light measurement in one lens mount 4a. The binoculars of this embodiment comprise automatic light adjusting binoculars in which the adjustment of the amount of light that passes through the lens mounts is automatically performed depending on the brightness of the object. These automatic light adjusting binoculars are equipped with lens mounts 4a and 4b comprising, from the object side, object lens optical systems 1a and 1b, erect prism systems 2a and 2b, and eyepiece optical systems 3a and 3b, respectively. These automatic light adjusting binoculars are also equipped with light measurement system 15, control system 16 that processes signals from light measurement system 15 and generates light adjustment signals, and light adjusting shutters 17a and 17b that adjust the amounts of light to pass through lens mounts 4a and 4b based on signals from control system 16. Control system 16 adjusts the apertures of shutters 17a and 17b in accordance with the light measurement result output from light measurement system 15.

The entire second reflecting surface 11a of erect prism system 2a located in the optical path of lens mount 4a is coated with semi-transmitting film HM, as a light rays separating means to extract a portion of the light rays. This semi-transmitting film HM separates and extracts a portion of the light rays that enter erect prism system 2a from object lens optical system 1a and leads the light rays to light measurement system 15. Light measurement system 15 performs light measurement using the light rays thus extracted by semi-transmitting film HM.

On the other hand, the entire second reflecting surface 11b of erect prism system 2b located in the optical path of lens mount 4b is coated with silver reflecting film AM. ND filter 10 is placed behind shutter 17b in the optical path of lens mount 4b in order to equalize the transmissivities of the light passing through lens mounts 4a and 4b. ND filter 10 is a member separate from object lens optical system 1b, erect prism system 2b, shutter 17b and eyepiece optical system 3b.

While only light rays in lens mount 4a are used for the purpose of light measurement, the difference in the amount of the light advancing to eyepiece optical system 3a and the light advancing to eyepiece optical system 3b is eliminated by this ND filter 10. Consequently, discomfort caused by the difference in the brightness of the light in lens mount 4a and the light in lens mount 4b may be prevented when the user looks into the binoculars with both eyes.

Using the sixth embodiment, automatic light adjustment may be performed by extracting a portion of the light rays from the optical path of one lens mount 4a without inflicting on the user discomfort caused by the difference in the amount of light between the light advancing to eyepiece optical system 3a of lens mount 4a and the light advancing to eyepiece optical system 3b of lens mount 4b.

In the sixth embodiment, a color compensating filter may be used instead of ND filter 10, and differences in the amount of light between the two lens mounts may be corrected by means of shutters 17a and 17b. In this case, the apertures of shutters 17a and 17b are separately controlled so that they will have different diameters in response to the same light measurement result output from light measurement system 15. Using this construction, differences both in the color of light and amount of light may be eliminated.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A pair of binoculars, comprising:

a first optical system;

a second optical system;

means for extracting from the first optical system a portion of light rays that pass through the first optical system;

means for examining the extracted light rays;

means for adjusting parts of the first and second optical systems based on a result of the examination of the extracted light rays; and means located in the second optical system for controlling light rays in the second optical system so that light rays passing through the second optical system are equivalent to the light rays passing through the first optical system;

wherein the controlling means include means for controlling a color of the light rays in the second optical system.

2. The pair of binoculars of claim 1, wherein the examining means includes means for performing a distance measurement based on the extracted light rays.

3. The pair of binoculars of claim 2, wherein the adjusting means includes means for adjusting the first and second optical systems based on a result of the distance measurement.

4. The pair of binoculars of claim 1, wherein the examining means includes means for measuring an amount of light in the extracted portion of light rays.

5. The pair of binoculars of claim 4, wherein the adjusting means include light adjusting shutters that adjust an amount of light passing through the binoculars.

6. The pair of binoculars of claim 1, wherein the extracting means includes a half mirror.

7. The pair of binoculars of claim 1, wherein the extracting means includes a semi-transmitting film.

8. The pair of binoculars of claim 1, wherein the controlling means includes a filter.

9. The pair of binoculars of claim 1, wherein the first optical system includes a first object lens optical system, a first erect prism system, and a first eyepiece optical system; and the second optical system includes a second object lens optical system, a second erect prism system, and a second eyepiece optical system.

10. The pair of binoculars of claim 9, wherein the first erect prism system includes a reflecting surface and the reflecting surface is coated with a semi-transmitting film.

11. The pair of binoculars of claim 10, wherein the controlling means includes a correcting film in the second optical system.

12. A pair of binoculars, comprising:

a first optical system;

a second optical system;

wherein a reflecting surface of the first optical system is a semi-transmitting surface which extracts a portion of light rays passing therethrough;

the semi-transmitting surface having reflectance characteristics such that:

$$|a^*(TB) - a^*(TA)| \leq 4$$

$$|b^*(TB) - b^*(TA)| \leq 4;$$

where $a^*(TA)$ and $b^*(TA)$ are values of $a^*$ and $b^*$ of the CIELAB color system regarding light passing through the first optical system, and $a^*(TB)$ and $b^*(TB)$ are values of $a^*$ and $b^*$ on the CIELAB color system regarding the light passing through the second optical system.

13. The pair of binoculars of claim 12, wherein the first optical system includes a first object lens optical system, a first erect prism system, and a first eyepiece optical system; and the second optical system includes a second object lens optical system, a second erect prism system, and a second eyepiece optical.

14. The pair of binoculars of claim 13, wherein the reflecting surface is on the first erect prism system.

15. The pair of binoculars of claim 13, further comprising a distance measurement system, and/the portion of light rays extracted from the first optical system are directed to the distance measurement system for performing a distance measurement.

16. The pair of binoculars of claim 15, further comprising means for adjusting parts of the first and second optical systems based on the distance measurement.

17. A pair of binoculars, comprising:

a first optical system having an extracting device which extracts a portion of light rays that pass through the first optical system;

means for examining only the light rays extracted from the first optical system;

a second optical system having a control device which controls light rays in the second optical system so that light rays passing through the second optical system are equivalent to the light rays passing through the first optical system; and means for adjusting parts of the first and second optical systems based on a result of the examination by the examining means of the light rays extracted from the first optical system;

wherein the extracting device and the controlling device have substantially the same optical characteristics.

18. The pair of binoculars of claim 17, wherein the controlling means includes a half mirror.

19. The pair of binoculars of claim 17, wherein the extracting means includes a semi-transmitting film in the first optical system and the controlling means includes a semi-transmitting film in the second optical system.

20. The pair of binoculars of claim 17, wherein the extracting means includes a half mirror and the controlling means includes a half mirror.

21. The pair of binoculars of claim 17, wherein the extracting device includes a semi-transmitting film.

22. The pair of binoculars of claim 17, wherein the controlling device includes a semi-transmitting film.

23. The pair of binoculars of claim 17, wherein the controlling device includes a correcting film in the second optical system.

24. A pair of binoculars, comprising:

a first optical system;

a second optical system;

means for extracting from the first optical system a portion of light rays that pass through the first optical system;

means for examining only the light rays extracted from the first optical system;

means for adjusting parts of the first and second optical systems based on a result of the examination by the examining means of the light rays extracted from the first optical system; and means located in the second optical system for controlling light rays in the second optical system so that light rays passing through the second optical system are equivalent to the light rays passing through the first optical system;

wherein the first optical system includes a first object lens optical system, a first erect prism system, and a first eyepiece optical system; and the second optical system includes a second object lens optical system, a second erect prism system, and a second eyepiece optical system, wherein the first erect prism system includes a reflecting surface and the reflecting surface is coated with a semi-transmitting film.

25. The pair of binoculars of claim 24, wherein the controlling device includes a correcting film in the second optical system.

26. The pair of, binoculars of claim 17, wherein the controlling means controls the transmissivity of light of the second optical system so that the transmissivity of light passing through the second optical system equals the transmissivity of light passing through the first optical system.

27. The pair of binoculars of claim 17, wherein the controlling means controls an amount of light passing through the second optical system so that an amount of light passing through the second optical system equals an amount of light passing through the first optical system.

28. The pair of binoculars of claim 24, wherein the controlling means controls the transmissivity of light of the second optical system so that the transmissivity of light passing through the second optical system equals the transmissivity of light passing through the first optical system.

29. The pair of binoculars of claim 24, wherein the controlling means controls an amount of light passing through the second optical system so that an amount of light passing through the second optical system equals an amount of light passing through the first optical system.

* * * * *